United States Patent
Callard

(10) Patent No.: US 10,455,641 B2
(45) Date of Patent: Oct. 22, 2019

(54) PROTOCOL DATA UNIT MANAGEMENT

(71) Applicant: Aaron James Callard, Ottawa (CA)

(72) Inventor: Aaron James Callard, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/699,069

(22) Filed: Sep. 8, 2017

(65) Prior Publication Data

US 2018/0192472 A1 Jul. 5, 2018

Related U.S. Application Data

(60) Provisional application No. 62/442,731, filed on Jan. 5, 2017.

(51) Int. Cl.
*H04W 88/18* (2009.01)
*H04L 12/861* (2013.01)
*H04W 76/20* (2018.01)

(52) U.S. Cl.
CPC ....... *H04W 88/182* (2013.01); *H04L 49/9063* (2013.01); *H04W 76/20* (2018.02)

(58) Field of Classification Search
CPC .......................... H04W 88/182; H04L 49/9063
See application file for complete search history.

(56) References Cited

U.S. PATENT DOCUMENTS

| | | | | |
|---|---|---|---|---|
| 6,701,358 B1 * | 3/2004 | Poisson | ............... | H04L 12/4675 709/223 |
| 9,953,070 B1 * | 4/2018 | Hankins | ............ | G06F 17/30563 |
| 2001/0052006 A1 * | 12/2001 | Barker | ................ | H04L 41/0213 709/223 |
| 2011/0213889 A1 * | 9/2011 | Krotz | .................... | G06F 19/321 709/228 |
| 2017/0214759 A1 * | 7/2017 | Timiskov | ................ | H04L 67/28 |

OTHER PUBLICATIONS

"Evolved Universal Terrestrial Radio Access Network (E-UTRAN); S1 data transport"; 3GPP TS 36.414 V13.0.0 (Dec. 2015).
"General Packet Radio System (GPRS) Tunnelling Protocol User Plane (GTPv1-U)"; 3GPP TS 29.281 V13.2.0 (Jun. 2016).
"General Packet Radio Service (GPRS) enhancements for Evolved Universal Terrestrial Radio Access Network (E-UTRAN) access"; 3GPP TS 23.401 V14.2.0 (Dec. 2016).
"Study on Architecture for Next Generation System"; 3GPP TR 23.799 V14.0.0 (Dec. 2016).

* cited by examiner

*Primary Examiner* — Jay P Patel

(57) ABSTRACT

A system and method is provided for configuring a plurality of PDU sessions. In an implementation, a core network function transmits a PDU bulk configuration request to at least one network node associated with the plurality of PDU sessions. The PDU bulk configuration request including a PDU session identifying component to enable the at least one network node to identify the plurality of PDU sessions, and includes a PDU session modifying component identifying required changes to one or more PDU session parameters to configure the plurality of PDU sessions.

28 Claims, 4 Drawing Sheets

PROTOCOL DATA UNIT MANAGEMENT

FIELD

The present invention pertains to the field of communication networks and in particular to systems and methods for managing protocol data units.

BACKGROUND

In order to send control instructions between network entities, and to manage the operation of the network, service data units (SDUs) are created by applications or higher layers within the network. The SDUs contain the control information that needs to be exchanged between network entities in order to achieve the desired network functionality.

In order to send SDUs between layers, they must be passed across network interfaces which serve to connect different network layers. While the application, or higher layer, understands the structure of the data in the SDU, the lower layer treats the SDU as a payload to be delivered to the same interface at the destination. The SDU is accordingly packaged within a protocol data unit (PDU) by a protocol layer in order to add certain data to the SDU to allow it to be appropriately processed by the network entities. The PDU is the structured information that is passed to a matching protocol layer further along on the transfer through the network that allows the layer to deliver its intended function or service.

In conventional communication networks PDUs may be generated on a per-session basis, and the additional information that is added to the SDU may be fixed for each session. The creation of a new PDU session is the triggering event for establishing the content to be included in subsequent PDUs generated for that session. In conventional networks, and in particular wireless communication networks, the PDU sessions are short-lived, which results in the additional information being current.

The $3^{rd}$ Generation Partnership Project (3GPP) technical report numbered TR 23.799 and entitled "Study on Architecture for Next Generation System," version 0.8.0, September 2016 (hereinafter referred to as TR 23.799), represents one approach to the design of a system architecture for next generation mobile networks, also referred to as $5^{th}$ generation (5G) networks. In proposed "next generation" (NG) networks, such as 5G wireless communication networks, additional flexibility and functionality is available to the network. Furthermore, it is proposed to have many more connections to the network as the Internet of Things (IoT) brings connectivity to a new range of devices. The inventor has perceived that there will be a need for novel systems and methods to manage PDUs in such an environment.

This background information is provided to reveal information believed by the applicant to be of possible relevance to the present invention. No admission is necessarily intended, nor should be construed, that any of the preceding information constitutes prior art against the present invention.

SUMMARY

In an embodiment, a method is provided for configuring a plurality of PDU sessions comprising a core network function: transmitting a PDU bulk configuration request to at least one network node associated with the plurality of PDU sessions; wherein the PDU bulk configuration request includes a PDU session identifying component to enable the at least one network node to identify the plurality of PDU sessions, and includes a PDU session modifying component identifying required changes to one or more PDU session parameters to configure the plurality of PDU sessions.

In an embodiment, a network function operative to configure a plurality of PDU sessions comprising: a network interface for receiving data from and transmitting data to network functions connected to a network; a processor; and a non-transient memory for storing instructions that when executed by the processor cause the network function to be configured to: transmit a PDU bulk configuration request to at least one network node associated with the plurality of PDU sessions; wherein the PDU bulk configuration request includes a PDU session identifying component to enable the at least one network node to identify the plurality of PDU sessions, and includes a PDU session modifying component identifying required changes to one or more PDU session parameters to configure the plurality of PDU sessions.

In an implementation, the PDU session identifying component comprises use of at least one of: a filter; a group label or identifier; and, header logic.

In an implementation, the PDU bulk configuration request is transmitted to a plurality of network nodes. Each of the plurality of network nodes may configure one or more of the plurality of PDU sessions.

In an implementation, the at least one network node comprises at least one access node providing connectivity to the network.

In an implementation, the PDU session modifying component further defines a time window in which the PDU bulk configuration request should be applied.

In an implementation, the PDU session modifying component further comprises a command component to be applied to the filtered PDU sessions.

In an implementation, the command component is selected from the group consisting of: PDU Session Setup; PDU Session Modify; PDU Session Modification Indication; Initial Context Setup; and, UE Context Modification Indication.

In an embodiment, a method is provided for configuring a plurality of PDU sessions comprising a network node: receiving, from a core network function, a PDU bulk configuration request, the PDU bulk configuration request including a PDU session identifying component, and including a PDU session modifying component; applying the PDU session identifying component to identify the plurality of PDU sessions to be configured; and, applying the PDU session modifying component to change one or more PDU session parameters of the identified plurality of PDU sessions to configure the plurality of PDU sessions.

In an embodiment, A network node operative to configure a plurality of PDU sessions comprising: a network interface for receiving data from and transmitting data to network functions connected to a network; a processor; and a non-transient memory for storing instructions that when executed by the processor cause the network node to: receive, from a core network function, a PDU bulk configuration request, the PDU bulk configuration request including a PDU session identifying component, and including a PDU session modifying component; apply the PDU session identifying component to identify the plurality of PDU sessions to be configured; and, apply the PDU session modifying component to change one or more PDU session parameters of the identified plurality of PDU sessions to configure the plurality of PDU sessions.

In an implementation, the applying the PDU session identifying component to identify the plurality of PDU sessions to be configured comprises: applying a filter parameter to PDU sessions managed by the access node to identify the plurality of PDU sessions that match the filter parameter.

In an implementation, the applying the PDU session identifying component to identify the plurality of PDU sessions to be configured comprises: retrieving a group identifier from the PDU session identifying component and, identifying the plurality of PDU sessions that match the group identifier.

In an implementation, the applying the PDU session identifying component to identify the plurality of PDU sessions to be configured comprises: retrieving a header logic command from the PDU session identifying component; applying the header logic command to PDU sessions managed by the access node to identify the plurality of PDU sessions that conform with the header logic command.

In an implementation, the network node comprises an access node providing connectivity to the network.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
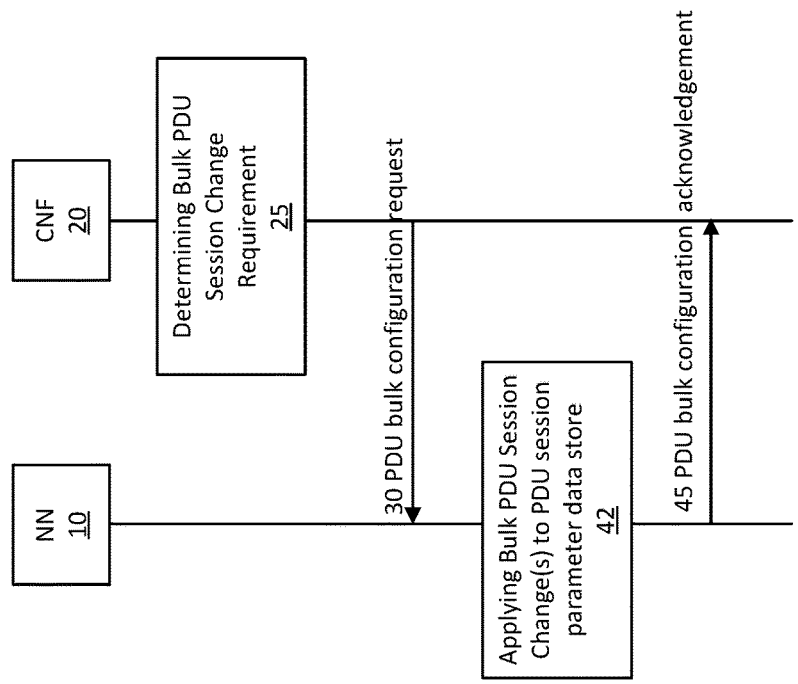
FIG. 1 presents a signalling diagram illustrating an embodiment of a bulk PDU configuration procedure.

The present application relates to managing PDUs, and in particular to supporting PDU modifications within an existing PDU session. In conventional communication networks PDUs may be generated on a per-session basis. Since PDU sessions are currently relatively short-lived, the information included in each PDU is typically current. Furthermore, current networks have more limited routing and data traffic handling capabilities and options, as compared with the proposed NG networks. An issue that has been identified by the inventor is that there will likely be many more PDU sessions in NG networks, and in aggregate those PDU sessions will likely be of longer duration than is currently the case. In some cases, there may further be more control signalling per PDU session, than with current networks. Based on the nature of NG networks, control signalling delay (RTT) may be an important enabling factor for specific applications, such as ultra-reliable low latency communication (URLLC).

As a result of these options, the inventor is proposing a system and method for managing PDUs which may reduce control signalling transferred across the network, may reduce delay during Transport Network Layer (TNL) failure or handover, and may reduce control signaling delay (RTT) in certain circumstances.

NG networks are likely to result in an increased number of PDU sessions and, in aggregate, the length of those PDU sessions is likely to be longer than is currently the case. PDU sessions are likely to increase in number due to a number of factors, including for instance: i) network slicing; ii) "new state"; iii) multi transmit reception point (TRP) Access Node (AN); iv) Machine-type communications (MTC); and, v) "Make before Break" handovers.

Additionally, unlike in previous solutions where the CN always knows which users are active, in the current solution the CN (at least the control plane of the CN) is unaware of the difference between users in 'new state' or active. Thus, the control plane functions cannot prioritize the update of active users which are impacted by delay, and users which are not sending/receiving and are not impacted by delay.

Accordingly, in NG networks, in the event of a network reconfiguration or failure, such as a link/node failure, many active PDU sessions will need to be reconfigured within a short time window in order to meet the latency requirements.

The present application provides a method for configuring, or re-configuring, multiple PDU sessions at the same time through a bulk change operation. Three specific exemplar operational implementations are described, namely: i) filtering; ii) naming or labelling; and, iii) logic (i.e. header logic). The exemplar operation implementations are non-limiting, and are meant to provide examples of specific mechanisms for implementing a bulk change operation. In some aspects, the system may be operative to process more than one of the exemplar operations. In some aspects, the system may be operative to process more than one of the exemplar operations applied as a combination in a single PDU bulk change request. For instance, a PDU bulk change request may include a name or label, and seek to have the receiving Network Node (NN) further apply a filtering operation. The receiving NN may comprise, for instance an access node, such as a radio access node, connecting a UE to the network. Alternatively, the receiving NN may comprise a node of the network operative to establish or modify PDU sessions.

Referring to FIG. 1, a NN 10 is associated with enabling a plurality of PDU sessions with one or more connected UE. A core network function (CNF) 20 is responsible for managing the PDU sessions, and monitoring the network resources available to service the PDU sessions. Depending upon pre-determined criteria, in step 25 the CNF 20 determines that there is a bulk PDU session change requirement. The determination may include the steps of determining that it is necessary to configure a plurality of PDU sessions. The plurality of PDU sessions may comprise either a configuration of a plurality of new PDU sessions, or to reconfigure a plurality of currently existing PDU sessions. The determination may further include determining what new PDU session parameters are required to meet the change requirement. The configuration or reconfiguration may be necessary for a variety of reasons, some examples of which are described below.

After determining the bulk PDU session change requirement, in step 30 the CNF 20 transmits a PDU bulk configuration request to the NN 10 associated with the PDU sessions that are to be changed. The PDU bulk configuration request including a PDU session identifying component and a PDU session modifying component. The PDU session identifying component including sufficient information to identify the plurality of PDU sessions. The PDU session modifying component including sufficient information to identify the PDU session parameter changes to be made to the identified plurality of PDU sessions. Exemplar implementations of PDU session modifying components and PDU session identifying components are described in this application.

In an implementation, a plurality of PDU bulk configuration requests may be transmitted to a corresponding plurality of NNs 10 associated with PDU sessions that are determined to require PDU session parameter changes. In the aspect, the plurality of PDU bulk configuration requests may be unique for each of the NNs 10, or some or all of the PDU bulk configuration requests may be the same for two or more of the plurality of NNs 10. In some aspects, the CNF 20 may send the same PDU bulk configuration request to a plurality of NNs 10, and send one or more NN-specific PDU bulk configuration requests to a corresponding one or more of the NNs 10, depending upon requirements. Generally, the number of different PDU bulk configuration requests may be determined based upon the nature of the PDU session parameter changes being made.

After receiving the PDU bulk configuration request from the CNF 20, in step 42 each NN 10 will apply the received PDU bulk configuration change(s) to corresponding PDU session parameters maintained in a PDU session parameter datastore maintained by that NN 10. In some aspects, the datastore may comprise, for instance, a lookup table of PDU session parameters. In some aspects, the datastore may comprise, for instance, a database of PDU session parameters. After applying the received PDU bulk configuration change(s), the PDU session parameter data store maintained by that NN 10 is updated to include updated PDU session parameters corresponding to the change(s) requested by the PDU bulk configuration request.

In step 45 the NN 10 transmits a PDU bulk configuration acknowledgement to the CNF 20, confirming that the requested changes have been made and that the PDU session parameter data store maintained by that NN 10 has been updated to include the updated PDU session parameters.

The form of the PDU bulk configuration request may differ, depending upon the type of change requested, and the grouping of the PDU sessions to be identified and changed by the PDU bulk configuration request. Three exemplar implementations of PDU session modifying components and PDU session identifying components are provided below.

The first implementation for managing bulk PDU session changes comprises a filter-based PDU session identifying component for bulk configuration of PDU sessions. In order to implement filter-based bulk configuration, the PDU bulk configuration request includes both a PDU session identifying component and a PDU session modifying component. In this example, this may include three components: i) filter component; ii) command component; and, iii) data mapping component. The command component and the data mapping component comprise implementations of PDU session modifying components.

Figure 2:
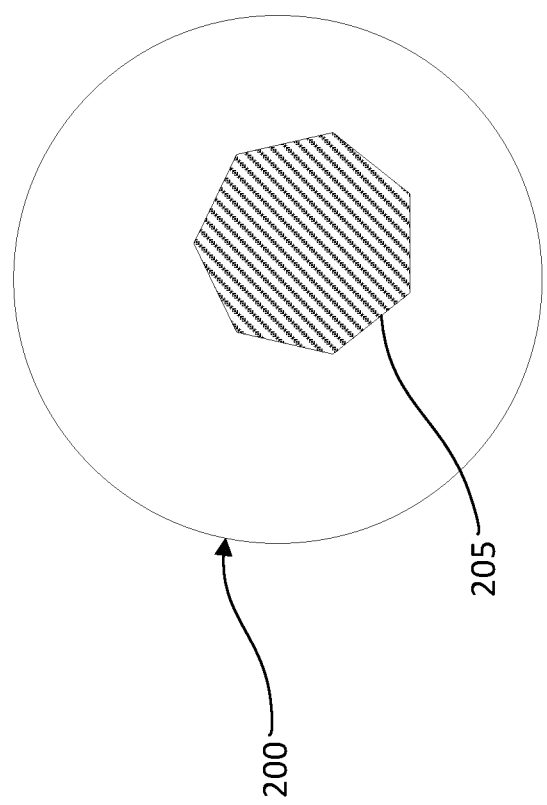
FIG. 2 is an illustration presenting operation of an embodiment of a PDU filter operation.

The filter component provides a series of filtering parameters which, when applied to the currently connected PDU sessions, identifies a subset of PDU sessions (i.e. given all the PDU sessions, applying the filtering parameters filters them down to a subset of identified PDU sessions. Referring to FIG. 2, operation of an exemplar filtering operation is illustrated. The circle 200 represents the set of all PDU sessions handled by the NN 10. The filter region 205 represents the filtered set of PDU sessions that match the filter criteria included as part of the filter component.

A filter, used in the same context as in data processing, is a way to define a subset of all the PDU sessions associated with a NG-C link. This filtering component associates all PDU sessions with shared characteristics. Some commonly used characteristics over which filters could be applied include:

the destination IP address in the Transport Network Layer (TNL) (i.e. all PDU session which have the TNL configured to send to IP address X)

The 'Slice ID', this is a field associated with a long term configuration.

Mobility manager ID

Temporary Mobile Subscriber Identity (TMSI) values, Radio Network Temporary Identifier (RNTI)

Tunnel Endpoint Identifier (TEID) values/PDU session ID

Network slice selection association information (NSSAI), Temp ID

Interface (i.e. all PDU sessions associated with a particular NG-U interface)

State (the time/process at which these commands were intended)

In some circumstances, the sender of the filtering component may know exactly which sessions it wishes to update, and is using the bulk messaging to reduce signaling. To ensure that the components match correctly this sender may append additional information to ensure that only the intended PDU sessions are effected. This can be done in several ways listed below.

The sender appends an indication of the expected PDU sessions to be modified, for instance a counter of the number of sessions expected or a HASH of all the TEIDs affected, or other secondary indication, i.e. a modification indication. Alternatively, and/or in addition, the receiver responds with an indication of the PDU sessions modified, i.e. a modification confirmation indication. This modification confirmation indication could be, for instance, a list of the PDU session identifiers effected, a function of the new 'state' of the relevant PDU sessions (i.e. a HASH), a counter of the number affected, or other indication of the number and/or type of PDU sessions modified. In some implementations, the response may simply be a confirmation. In this case the NN 10 may apply the changes irrespective, or without any further, response from the CNF 20, or could require receipt by the NN 10 of an additional acknowledgement or instruction before the changes are implemented (i.e. the changes are made only after the response is confirmed).

Figure 3:
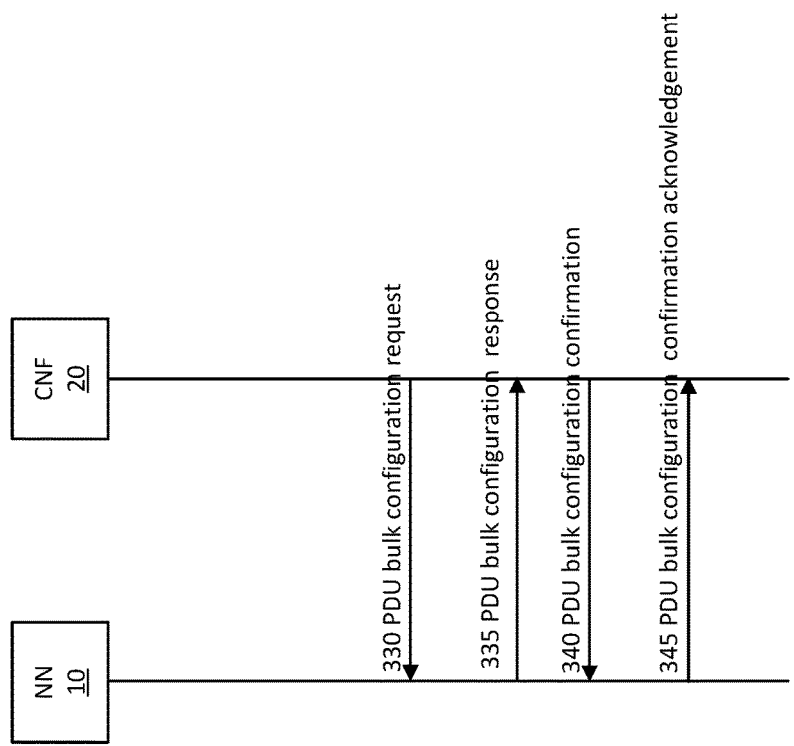
FIG. 3 presents a signalling diagram illustrating an embodiment of a bulk PDU configuration procedure.

Referring to FIG. 3, in an implementation the NN 10 may be operative to confirm that the requested bulk PDU session changes are correct, before applying the changes. In step 330 the CNF 20 transmits a PDU bulk configuration request to the NN 10 associated with the PDU sessions that are to be changed. As will be appreciated, this may apply to a plurality of NNs 10 depending upon the PDU session change requirements. The PDU bulk configuration request including a PDU session identifying component and a PDU session modifying component.

After receiving the PDU bulk configuration request from the CNF 20, the NN 10 reviews the PDU session identifying component and the PDU session modification component in the PDU bulk configuration request, and in step 335 returns a PDU bulk configuration response seeking confirmation that the proposed changes are correct. In some implementations, the PDU bulk configuration response may include a modification confirmation indication as described above. After receiving the PDU bulk configuration response and, if relevant, reviewing the proposed changes in the modification confirmation indication, in step 340 the CNF 20 transmits a bulk configuration confirmation to the NN 10. Upon receipt of the bulk configuration confirmation, the NN 10 applies the proposed changes to the corresponding PDU session parameters, and in step 345 transmits a PDU bulk configuration confirmation acknowledgement indicating receipt of the PDU bulk configuration confirmation and application of the requested PDU session parameter changes.

By way of a first example, the filter may be applied as a combination of a wildcard and a string portion, where all PDU sessions that match a portion of the string are identified as falling within the filter region 205. In this example, the filtering operation is the application of one or more filter fields which may be explained as being combined using set notation. Each filter field has three components: Field type: which PDU session parameter is considered (TEID, TIMSI, PDU Session ID, . . . ); Field Value: What is the Field compared to (i.e. an IP address if the field type is an IP address, a TIMSI if the field is a TIMSI); and, Matching Criteria: How is the field type and the field value compared (i.e. equals, not equals, less than, Bitmask equals) Conveniently, in some implementations multiple filter components may be combined together using set notation for (,), not, and, or, xor).

Example ASN.1 Code Illustrating an Application of the Example:

```
PDUSessionParam::= SEQUENCE
    {
        Field_type    variable_field_types
        Field_value   BITSTRING % the thing to compare against
        MatchingCriteria    CHOICE{
            Bitmask BITSTRING
            EQUALS     BOOLEAN       % true is equals,
                                     false is not equals
            COMPARE    BOOLEAN       % true is lessthan, false
                                     is greaterthan
        }
    }
PDUSessionFilterComponent ::= CHOICE
    {
        operator ENUMERATED {
            open_bracket,
            close_bracket,
            not,
            and,
            or,
            xor
        }
        param PDUSessionParam
    }
```

By way of a second example, the filter may be applied to groups of PDU sessions that may be jointly modified, or preconfigured. As part of the PDU session creation message, an additional parameter is assigned which is 'group ID'. A PDU session can belong to 0→N groups, with a group most likely defined by a number for convenience, however other formats such as URI are possible. This may allow for hierarchical configurations.

As part of a PDU session modification message, the group IDs are provided. The NN 10 then determines which devices/PDU sessions belong to that group. Modifications may then be applied to that group.

An example of this solution could be applied to network slices, for instance, with a group ID such as /MBB/NFID/QoS, where the MBB is the slice type, the NFID represents which NF is in the next hop, and the QoS is the QoS associated with this parameter. Note that the meaning of all of the field parameters may be transparent to the NN 10 as it simply sees a Uniform Resource Indicator (URI) and is not required to understand why it has this configuration. Other descriptions may be used as a Group ID such as Uniform Resource Name (URN) (i.e. info type: info) or the formatting used in MoM/Publish subscribe.

In an example, the bulk change may be applied with reference to PDU sessions and their related information, instead of identifying the PDU sessions based on end host identity. At a high level there are three approaches: i) 'Topic' (hierarchical, longest match, &&, ||, XOR, . . . ); ii) Content (wildcard, regex etc); and, iii) Hybrid (searching within topic restrictions. Accordingly, the filter component is not limited to filtering by end host identity, and PDU sessions may be filtered based on other PDU session identifying information.

After the PDU sessions have been successfully filtered, a command component may be applied to modify the filtered PDU sessions. The command component is a standard component that is normally carried over NG-C (i.e. GTP-C) that provides the messaging required for configuration of the NG-U (i.e. PDU session creation/modification etc). The command component informs the NN 10 about what actions it should take on the subset of PDU sessions defined by the filter component.

For example, the command component may include command messages such as:
PDU Session Setup
PDU Session Modify
PDU Session Modification Indication
Initial Context Setup
UE Context Modification Indication In legacy systems messages typically consist of a set of information elements (IE) which have fixed values associated with every command. To determine the values of these IE the Mapping function described below is used.

The data mapping component provides ways for the variables in the traditional command messages to be more flexible and dynamic than previously expressed i.e. the new UE Aggregate Maximum Bit Rate may be mapped to 1.3 times the current UE Aggregate Maximum Bit Rate).

The data mapping component provides methods to map one value to another. For instance, the mapping of TMSI to TEID, or DRB QoS to Tunnel QoS. The mapping function provides the input IE associated with the commands mentioned above.

There are several basic examples:

Fixed value: This is the simplest option in which a single value is assigned to all of the filtered PDU sessions. For instance, when modifying TNL parameters, the filtered PDU sessions are updated with identical TNL parameters (i.e. all modified sessions will be modified to have the same next hop). In this case the fixed value is given to the NN 10 to apply when modifying the filtered PDU sessions.

Mapped value: The parameter for this IE is taken ("mapped") from another value. If the bitfields are the same size then this mapping may be done directly. For instance, the IE which would normally indicate the TEID may be 'mapped' to the device T-IMSI. This mapping value should indicate both which field it is mapped from, and any transformations that may be applied to that mapped value. A very common choice would be for the IE to be based upon the current value of that IE. In this case the NN 10 is applying variable information based on the mapping criteria to the filtered PDU sessions.

Calculated value: The NN 10 calculates a value based upon defined criteria, and typically AN-specific environment variables. There can be several options for this depending on the intended behavior. In this case the NN 10 is applying a rule or calculation parameter(s) which may include either variable information, or variable calculation parameter(s). Some examples include
  a. Unique: The NN 10 should choose a value which is unique over this NG-C interface. (i.e. choose a new TIMSI)
  b. Sequential: The NN 10 should choose a number sequentially, starting at an indicated value.
  c. Implementation: The NN 10 is free to choose a value however it desires, typically unique for the PDU sessions handled by that NN 10.

Example Pseudo Code:

```
MAPPING_VALUE ::= CHOICE{
    constValue    generic_value_encasulator % a encasulator of a
TVL for whatever the parameter is
    mappedValue SEQUENCE{
        IE_value      IE_type % the type field
        IE_transform tranform
    }
    calculatedValue    CHOICE{
        unique unique_params
        sequential sequential_params
        implementation implementation_params
    }
}
```

As an example of a command-based operation, the NN 10 may receive a group configuration message and uses the session filter on all of the active PDU sessions. This results in a list of 'filtered sessions'.

For each of these filtered sessions the NN 10 calculates the effective command/message that the NN 10 would have received over regular transmission. It does this by applying the mapping command to each of IE associated with the command message. This generates all the necessary IE.

The NN 10 behaves as if it received a message for each of these PDU sessions.

If the command message results in a response message, it may be acceptable to generate a bulk response using the same format described here.

This group configuration can be applied to new devices upon entry to the network. Once a device enters the network, it would be checked against the session filter, and messages would be applied accordingly. As multiple session filters may be present, a strict priority of group configuration messages should be possible.

In some cases the services may not currently exist within a particular NN 10 at the time of configuration by the CNF 20. In an implementation the Session Filters can be configured to continue to apply to new PDU sessions as they arrive (i.e. the services are implemented at that NN 10). In some implementations, the Session Filters may be configured to apply to PDU sessions that arrive within a given time window. After the time window the Session Filters may expire and the NN 10 will no longer make apply that PDU bulk configuration.

Several methods may be used to set a time window, or otherwise limit the time during which a PDU bulk configuration operation may remain operative. The bulk configuration operation may, for instance, be provided with a time validity, or with a reference/name and version number. In some implementations, the NN 10 may be operative to replace a previous PDU bulk configuration or update the previous PDU bulk configuration upon receipt of a new PDU bulk configuration that has a higher (i.e. newer) version number, or most recent issue data/time, for instance.

When a time window is implemented, a NN 10 may be operative to apply the PDU bulk configuration to any incoming new PDU sessions during the specified time window, i.e. within the time frame defined by the time window. The time window may be defined as being from present (i.e. receipt of the PDU bulk configuration request) to an expiry time X, for a future time window starting at time Y and ending at time Z, or starting at a specified time and continuing for an indeterminate period until overridden or canceled by a future PDU bulk configuration cancellation message transmitted by the CNF 20 to the NN 10. Receipt of a PDU bulk configuration request may serve as a trigger for the NN 10 to delete/override/pause/resume a previous PDU bulk one using the reference provided then. This could allow, for instance, for scheduled updates: e.g. if a slice X will be pulled down for maintenance between 2 and 3 am, 11 PDU sessions of slice X may be shifted to slice Y at 1:45 am by a PDU bulk configuration until 3:15 am. The time window of 1:45 am to 3:15 am being the time window for the PDU bulk configuration to allow for the maintenance on slice X.

In an embodiment, bulk PDU session changes may be applied as a group-based bulk configuration of PDU sessions, where specific groups of PDU sessions are jointly modified/preconfigured based upon an additional label or group identifier associated with the PDU sessions. In this embodiment, the group identifier is introduced by the NN 10 to the PDU sessions in advance at the time of initial session configuration. In this embodiment, the 'filter' discriminant is simply the group identifier(s) associated with the PDU session(s) that is(are) to be modified.

For instance, at the time of initial PDU session configuration, as part of the PDU session creation message, an additional parameter is assigned to the PDU session(s) which is the group identifier or 'group ID'. A particular PDU session can belong to 0→N groups, with a group most likely defined by a number. However other formats such as URI are possible, which may allow for hierarchical configurations if required. For instance, PDU sessions may be associated with a PDU session identifier that may include, for instance, group ID/sub-group ID/session ID, that permits more granular identification of PDU sessions within a larger group. In some implementations, the full PDU session identifier may uniquely identify the PDU session.

As part of a PDU session modification message (i.e. a PDU session bulk configuration request), the group ID(s) is/are provided as the PDU session identifying component. In some implementations, the session identifier including the group ID may be provided as the PDU session identifying component. The AN (i.e. NN 10) retrieves the group ID and applies the group ID to determine the plurality of PDU sessions that match the group ID. The group ID may identify specific PDU sessions, such as the case for a session identifier, or may identify one or more UE to identify all PDU session associations associated with those one or more UE. In some implementations, the PDU session may include a PDU session identifier, and the NN 10 may be operative to identify a group ID component within that PDU session identifier. Modifications are then applied to that group of PDU sessions.

An example of a group ID, for instance, includes the string "/MBB/NFID/QoS", where the MBB is the slice type, the NFID represents which NF is in the next hop, and the QoS is the QoS associated with this parameter. Note that the meaning of the string components may be transparent to the NN 10 as it simply sees a URI and is not required to understand why the URI has a particular configuration.

Other descriptions such as Uniform Resource Name (URN) (i.e. info type: info) or the formatting used in MoM/Publish subscribe where the identifier is with reference to particular PDU sessions, instead of end hosts, may be implemented. At a high level there are three approaches:

'topic' (hierarchical, longest match, &&, ||, XOR, . . . )
Content (wildcard, regex etc)
Hybrid (searching within topic restrictions, Matching to a Group ID is the simplest version, but requires additional information introduced during PDU session creation. As part of the PDU session creation the PDU identifying component is provided by a group identifier field or session identifier field, e.g. PDU_GROUP ID field, included in the PDU session by the NN 10. In ASN.1, for instance, this ID could be expressed as:

PDUSessionGroupID::=INTEGER(0 . . . 2^32−1)

PDUSessionGroupIDs::=SEQUENCE(SIZE(0 . . . 10)) OF PDUSessionGroupID

In some cases, conveniently, this group ID may correspond to a slice ID, or other logical identity used by the Core network.

When supplying PDU bulk configuration/reconfiguration messages the PDU identifying component(s) (e.g. PDUSessionGroupID(s)) are supplied. These configuration/reconfiguration messages are then applied at all NNs 10 which support PDU sessions that match the PDUSessionGroupIDs. The presumption in the above is that for a PDU session which has a group, i.e. which matches any of the grouped messages, the NNs 10 apply the message to it.

To allow for more dynamic logic we can extend the message to include logical parameters. The receiver NN 10 would then apply the logical operators on top of the different PDU session IDs. In an example, ASN.1 code could be provided as follows:

```
PDUSessionGroupComponent::= CHOICE
{
    operator ENUMERATED {
        open_bracket,
        close_bracket,
        not,
        and,
        or,
        xor
    }
    ID   PDUSessionGroupID
}
PDUSessionGroupFilter::= SEQUENCE(SIZE(0..10)) OF
PDUSessionGroupComponent
```

As an alternative to simple matching, an operator may be applied to select PDU sessions within a group or field. As an example, a wildcard operator may be applied to in combination with a string component to be matched to select a subset of a broader group of PDU sessions.

In this option, rather than operating on the group IDs as a whole, the individual bits of the group ID can be configured. This allows for the CNF 20 to identify and configure all IDs that match the string component, such as all IDs which begin with the value 1, for instance.

One method to indicate this is through a bitmask. In this case the filtering component has two parts, not necessarily in the follow order. For example, a first value is the value for which the numbers have to match, the second value indicates which components require matching. In ANS.1 code this could be

```
PDUSessionGroupID_filter::= SEQUENCE
{
    ID   INTEGER(0.. 2^32−1)
    Bitmask SEQUENCE(SIZE(32)) Of INTEGER(0..1))
}
```

The NN 10 would compare each bit of each PDUSessionGroupID with that provided in the ID field. A PDUSessionGroupID group ID would match if all bits for which the bitmask is one are equal. E.g.
Consider three PDUSessionGroupIDs expressed in binary (with only 6 bits instead of 32 for clarity).
G1=[1 1 1 1 1 1]
G2=[1 0 0 1 1 1]
G3=[1 0 1 0 1 1]
An example filter could have an ID of [1 1 1 1 1 1] with a bitmask of [1 0 1 0 0 1]. In this case only bits 1, 3 and 6 need to match. Thus the above filter would correspond to G1 and G3, but not G2 as the 3rd bit does not match.

The above could be combined with the logical combination operators as well. An example in ANS.1 code is given below.

```
PDUSessionGroupComponent ::= CHOICE
{
    operator ENUMERATED {
        open_bracket,
        close_bracket,
        not,
        and,
        or,
        xor
    }
    ID   PDUSessionGroupID_filter
}
```

As alternative, or in addition to, the above solutions, the PDU session identifying component provided in the PDU bulk configuration request may comprise header logic which may be interpreted by the NN 10 to identify the plurality of PDU sessions. For instance, the NN 10 is informed to interpret any TEID is receives, as some form of the device ID (TMSI). Thus, given this information the NN 10 may forward traffic accordingly. The header logic informs the NN 10 how to interpret logic embedded in the TEID (or other fields). This can be by describing what the bit fields represent i.e. TEID=TMSI or indicating what processing requirements are present. i.e. if MSB(TEID)=0, then process the data presuming the NN 10 received configuration x,y,z.

One simple way to implement the use of header logic is to create a table of formats, and have those different formats either configured in every PDU session (i.e. using the equivalent of the message type) or configured on an interface (NG-C/NG-C) basis.

In order to aid in the processing of millions of devices and sessions, it is desirable to enable low overhead real-time processing of packet forwarding. In an embodiment, this may be implemented by informing the mobility anchors (and potentially other user plane nodes) of any logical information contained within the NG1-U headers. This would allow the mobility anchor nodes to efficiently build their forwarding tables, as well as minimize storage overheads.

In an embodiment, tunnel provisioning may be done over ranges of values. In LTE terms this is equivalent to providing a F-TEID which is valid over a range TEID. For instance, all packets received with TEID in 1024-2047 are forwarded to the same PGW with the same parameters. If forwarding is based on the internal IP address, then similar provisioning should be possible.

To ensure the efficiency of this solution it is important to minimize the information within the bearer setup which does not pertain to the forwarding of traffic. For instance, the IMSI, MSISDN, and IP address are not required initially, and can be provided after first use if they are eventually needed. Other fields contained in an encapsulation header could be used such as session ID, device ID, or inner IP addresses.

To allow for accounting of different users' traffic, the user plane functions should be configurable to measure individual TEIDs traffic flows, or in certain circumstances only perform accounting over the ranges of TEIDs. This same approach should be valid for other messages, allowing fast and efficient changes of large numbers of sessions.

The mapping of TEID to a final billing account is done by the control plane at a later date. This can be thought of equivalently to pre-generating a range of radio bearers. These radio bearers at creation are not assigned to a particular device. They are instead either held by the control plane, or provided to the RAN to be used as needed.

A filtering operation may be combined with either the header logic or the group ID operations to assist with identifying the plurality of PDU sessions.

For instance, filters may be applied using logic such as:
Wildcards (bit/bytemasks) on fields
And
Or
XOR
NOT
Bracket These above filters can be applied over at least the following fields
Time
TEID
TMSI
TNL parameters
QoS
'state'

In some circumstances, group configurations may occur simultaneously with other PDU messages over the wire. For instance, a group configuration message is sent, but while that message is on the 'wire' a new PDU session request is received. In an embodiment the CNF 20 is operative to choose whether or not the original group configuration message applies to the new PDU session request. In an implementation, the CNF 20 is operative to:

Introduce a 'state ID' (Timestamp), which is updated with each change, which indicates the 'most up to date' version of the PDU sessions and/or bulk configuration message(s). When a group configuration is send the 'state ID' is included. Only PDU sessions which would match at that previous 'state', i.e. before, at, or within a predetermined window from, that time, are chosen by the filter.

Have the configured NN 10 (i.e. gNB) respond with a 'is this what you intended' message, i.e. a bulk configuration response message that seeks confirmation before making the configuration change(s) to the message(s). In an implementation, the bulk configuration response message indicates parameters associated with the configured command. The CNF 20 may then respond with a PDU bulk configuration confirmation acknowledgement, an additional response 'committing' this message is then sent.

Worked Examples

PDU Session Modify

As an example, the MME will move the User Plane (UP) connection from one node to another. For simplicity, it is assumed that all users are to be moved over from UPGW1 to UPGW2. In this example it is presumed that the current design is roughly described by the following commands. The Control Plane (CP) sends a PDU Session Modify message (e.g. a PDU bulk configuration request). This is presumably very similar to the E-RAB modify request defined over S1-AP.

| IE | Description | (S1-AP equivalent) |
| --- | --- | --- |
| Message type | An indicator that this is a PDU Session Modify Command | Message type |
| UE identifier | A 'unique' identifier of this UE | MME UE S1AP ID and eNB UE S1AP ID |
| Aggregate Rate DL | A limitation on all QoS on DL | Bit Rate (0-10 G)bps |
| Aggregate Rate UL | A limitation on all QoS on UL | Bit Rate (0-10 G)bps |
| Transport Layer Address | IP address | Transport Layer Address |
| Tunnel Parameters | Info used to configure tunnel header | TEID |
| QoS restrictions | A description on the authorized QoS for this PDU session | E-RAB Level QoS Parameters |

The response for this message sent by the NNs 10 is a PDU Session Modify Response (e.g. a PDU bulk configuration response).

| IE | Description | (S1-AP equivalent) |
| --- | --- | --- |
| Message type | An indicator that this is a PDU Session modify response | Message type |
| UE identifier | A 'unique' identifier of this UE | MME UE S1AP ID and eNB UE S1AP ID |
| PDU Session Failed to Modify List | A list of unsuccessfully modified PDU sessions along with an error code indication why there was a failure. | E-RAB Failed to Modify List |
| PDU Sessions Modified List | A list of successfully modified PDU sessions. | E-RAB Modify List |
| Criticality Diagnostics | Indication of malformed messaging (i.e. was there information missing in the message). | Criticality Diagnostics |

Bulk Messaging

The Bulk Message in this example contains the following elements

| IE | Description |
| --- | --- |
| Message type | An indicator that this is a Bulk Configuration command |
| sub Message Type | An indicator that this Bulk Configuration command refers to PDU Session Modify |
| Mapping Command List | A list of IE types, and mapping rules |
| Filter | A list IE types and filter rules |

Example

Assuming that there are two PDU session devices (UEs) are to be modified, initially they have the following PDU session parameters (simplified for ease of comprehension). For instance, the UE identifier may be a complicated structure with several fields (MME UE S1AP ID and eNB UE S1AP ID) which we just combine into the field A, and B. Note that the format below is for illustrative purposes only. Brackets < > indicate grouped parameters, with commas separating the parameters.

| Parameter | Device 1 | Device 2 |
|---|---|---|
| UE identifier | A | B |
| Aggregate Rate DL | 10 G | 10 G |
| Aggregate Rate UL | 10 G | 10 G |
| Transport Layer Address | 1.1.1.1 | 1.1.1.1 |
| Tunnel Parameters | 100001 | 100001 |
| QoS restrictions | QoS restriction 1 | QoS Restriction 2 |

The bulk message would be

| IE | | Value | | Notes |
|---|---|---|---|---|
| Message type | | Bulk Message | | // informs this is a bulk message |
| sub Message Type | | PDU Session Modify | | // informs this bulk message generates PDU Session Modify messages |
| Filter | | <Transport Layer Address, match, 1.1.1.1> | | // all PDU sessions which match the transport layer address 1.1.1.1> |
| Mapping Command List | IE out | Mapped from | Transform | A list of fields and how they are calculated, |
| > | UEidentifier | UEidentifier | Same | the UE identifier is determined from the IE UE identifier, with the transform 'same' applied to it. |
| > | Aggregate Rate DL | Aggregate Rate DL | Multiply 1.1 | Increase all DL aggregate rates by 1.1 |
| > | Aggregate Rate UL | Aggregate Rate UL | Same | Keep same |
| > | Transport Layer Address | Constant 1.1.1.2 | | Have 1.1.1.2 for all transport addresses |
| > | Tunnel Parameters | Tunnel Parameters | Same | Keep same |
| > | QoS restrictions | QoS restrictions | Same | Keep same |

Figure 4:
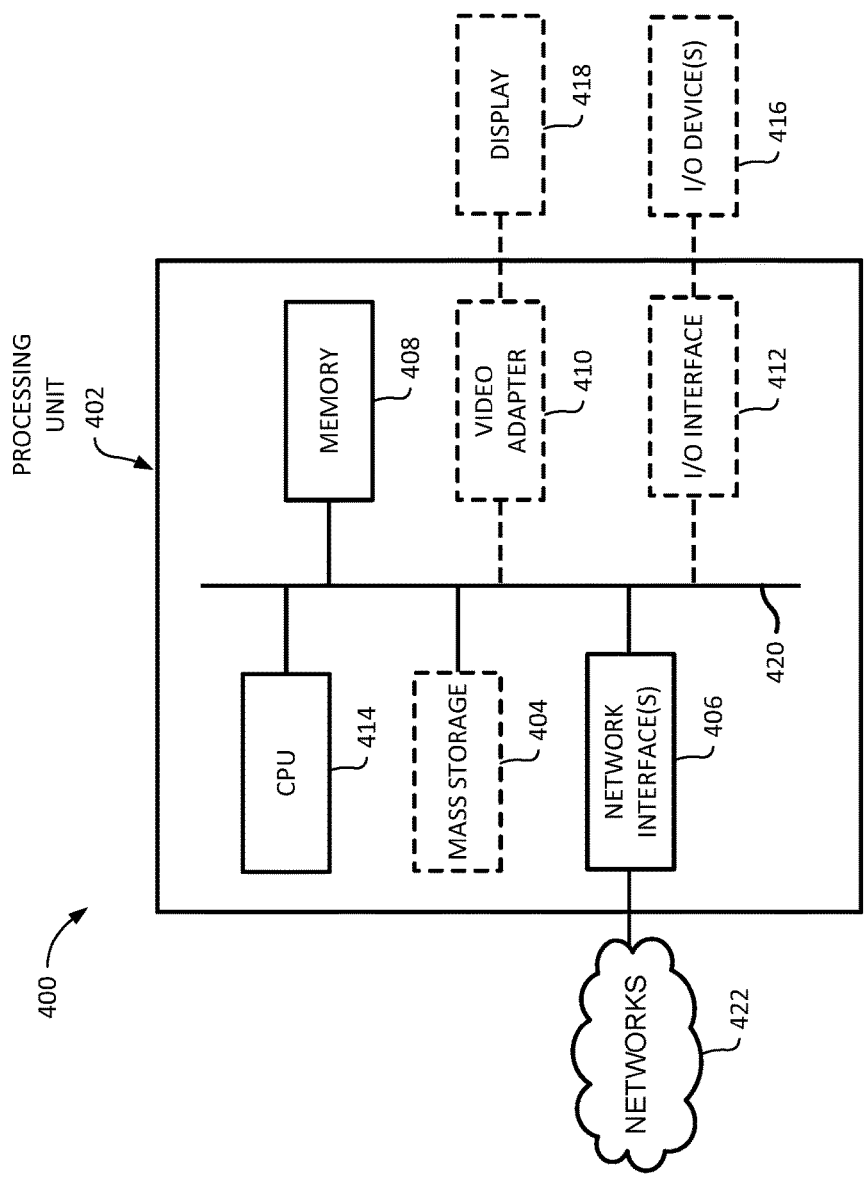
FIG. 4 is a block diagram illustrating an embodiment of a computing system.

FIG. 4 is a block diagram of a computing system 400 that may be used for implementing the devices and methods disclosed herein. In particular, the network nodes may each include one or more computing systems 400. The network functions described above may be instantiated by execution on one or more computing systems 400. In some aspects, a network function may be instantiated across a plurality of computing systems 400 across a plurality of geographic locations.

Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 400 includes a processing unit 402. The processing unit 402 typically includes a central processing unit (CPU) 414, a bus 420 and a memory 408, and may optionally also include a mass storage device 404, a video adapter 410, and an I/O interface 412 (shown in dashed lines). The computing system 400 may further include one or more network interface(s) 406 for connecting the computing system 400 to communication networks 422.

The CPU 414 may comprise any type of electronic data processor, and may include one or more cores or processing elements. The memory 408 may comprise any type of non-transitory system memory such as static random access memory (SRAM), dynamic random access memory (DRAM), synchronous DRAM (SDRAM), read-only memory (ROM), or a combination thereof. In an embodiment, the memory 408 may include ROM for use at boot-up, and DRAM for program and data storage for use while executing programs. The bus 420 may be one or more of any type of several bus architectures including a memory bus or memory controller, a peripheral bus, or a video bus.

The mass storage 404 may comprise any type of non-transitory storage device configured to store data, programs, and other information and to make the data, programs, and other information accessible via the bus 420. The mass storage 404 may comprise, for example, one or more of a solid state drive, hard disk drive, a magnetic disk drive, or an optical disk drive.

The video adapter 410 and the I/O interface 412 provide optional interfaces to couple external input and output devices to the processing unit 402. Examples of input and output devices include a display 418 coupled to the video adapter 410 and an I/O device 416 such as a touch-screen coupled to the I/O interface 412. Other devices may be coupled to the processing unit 402, and additional or fewer interfaces may be utilized. For example, a serial interface such as Universal Serial Bus (USB) (not shown) may be used to provide an interface for an external device. Alternatively, the computing system 400 may rely upon the network interface(s) 406 for connection to available mass storage(s), video adapter(s) 410, and I/O interface(s) 412 available on the networks 422.

Although the present invention has been described with reference to specific features and embodiments thereof, it is evident that various modifications and combinations can be made thereto without departing from the invention. The specification and drawings are, accordingly, to be regarded simply as an illustration, as defined by the appended claims, and are contemplated to cover any and all modifications, variations, combinations or equivalents that fall within the scope of the claims.

I claim:

1. A method for configuring a plurality of PDU sessions comprising a core network function:
   transmitting a PDU bulk configuration request to at least one network node associated with the plurality of PDU sessions, the at least one network node comprising at least one access node providing connectivity to the network;
   wherein the PDU bulk configuration request includes a PDU session identifying component to enable the at least one network node to identify the plurality of PDU sessions, and includes a PDU session modifying component identifying required changes to one or more PDU session parameters to configure the plurality of PDU sessions.

2. The method of claim 1, wherein the PDU session identifying component comprises use of at least one of:

i) a filter;
ii) a group label or identifier; and,
iii) header logic.

3. The method of claim 1, wherein the PDU bulk configuration request is transmitted to a plurality of network nodes.

4. The method of claim 1, wherein the PDU session modifying component further defines a time window in which the PDU bulk configuration request should be applied.

5. The method of claim 1, wherein the PDU session modifying component further comprises a command component to be applied to the filtered PDU sessions.

6. The method of claim 5, wherein the command component is selected from the group consisting of:
PDU Session Setup;
PDU Session Modify;
PDU Session Modification Indication;
Initial Context Setup; and,
UE Context Modification Indication.

7. A network function operative to configure a plurality of PDU sessions comprising:
a network interface for receiving data from and transmitting data to network functions connected to a network;
a processor; and
a non-transient memory for storing instructions that when executed by the processor cause the network function to be configured to:
transmit a PDU bulk configuration request to at least one network node associated with the plurality of PDU sessions, the at least one network node comprising at least one access node providing connectivity to the network;
wherein the PDU bulk configuration request includes a PDU session identifying component to enable the at least one network node to identify the plurality of PDU sessions, and includes a PDU session modifying component identifying required changes to one or more PDU session parameters to configure the plurality of PDU sessions.

8. The network function of claim 7, wherein the PDU session identifying component comprises use of at least one of:
i) a filter;
ii) a group label or identifier; and,
iii) header logic.

9. The network function of claim 7, wherein the PDU bulk configuration request is transmitted to a plurality of network nodes.

10. The network function of claim 7, wherein the PDU session modifying component further defines a time window in which the PDU bulk configuration request should be applied.

11. The network function of claim 7, wherein the PDU session modifying component further comprises a command component to be applied to the filtered PDU sessions.

12. The network function of claim 11, wherein the command component is selected from the group consisting of:
PDU Session Setup;
PDU Session Modify;
PDU Session Modification Indication;
Initial Context Setup; and,
UE Context Modification Indication.

13. A method for configuring a plurality of PDU sessions comprising a network node:
receiving, from a core network function, a PDU bulk configuration request, the PDU bulk configuration request including a PDU session identifying component, and including a PDU session modifying component;
applying the PDU session identifying component to identify the plurality of PDU sessions to be configured; and,
applying the PDU session modifying component to change one or more PDU session parameters of the identified plurality of PDU sessions to configure the plurality of PDU sessions;
wherein the network node comprises an access node providing connectivity to the network.

14. The method of claim 13, wherein the applying the PDU session identifying component to identify the plurality of PDU sessions to be configured comprises:
applying a filter parameter to PDU sessions managed by the access node to identify the plurality of PDU sessions that match the filter parameter.

15. The method of claim 13, wherein the applying the PDU session identifying component to identify the plurality of PDU sessions to be configured comprises:
retrieving a group identifier from the PDU session identifying component and, identifying the plurality of PDU sessions that match the group identifier.

16. The method of claim 13, wherein the applying the PDU session identifying component to identify the plurality of PDU sessions to be configured comprises:
retrieving a header logic command from the PDU session identifying component;
applying the header logic command to PDU sessions managed by the access node to identify the plurality of PDU sessions that conform with the header logic command.

17. The method of claim 13, wherein the PDU session modifying component further defines a time window in which the PDU bulk configuration request should be applied, and wherein the method further comprises the network node confirming to apply the PDU session modifying component during the defined time window.

18. The method of claim 11, further comprising:
the network node receiving a new PDU bulk configuration request; and,
replacing the PDU bulk configuration request with the new PDU bulk configuration request.

19. The method of claim 13, wherein the PDU session modifying component further comprises a command component to be applied to the filtered PDU sessions, and wherein the method further comprises the network node applying the command component to the filtered PDU sessions.

20. The method of claim 13, wherein the command component is selected from the group consisting of:
PDU Session Setup;
PDU Session Modify;
PDU Session Modification Indication;
Initial Context Setup; and,
UE Context Modification Indication.

21. A network node operative to configure a plurality of PDU sessions comprising:
a network interface for receiving data from and transmitting data to network functions connected to a network;
a processor; and
a non-transient memory for storing instructions that when executed by the processor cause the network node to:
receive, from a core network function, a PDU bulk configuration request, the PDU bulk configuration request including a PDU session identifying component, and including a PDU session modifying component;
apply the PDU session identifying component to identify the plurality of PDU sessions to be configured; and,
apply the PDU session modifying component to change one or more PDU session parameters of the identified plurality of PDU sessions to configure the plurality of PDU sessions;
wherein the network node comprises an access node providing connectivity to the network.

22. The network node of claim 21, wherein the applying the PDU session identifying component to identify the plurality of PDU sessions to be configured comprises:
applying a filter parameter to PDU sessions managed by the access node to identify the plurality of PDU sessions that match the filter parameter.

23. The network node of claim 21, wherein the applying the PDU session identifying component to identify the plurality of PDU sessions to be configured comprises:
retrieving a group identifier from the PDU session identifying component and, identifying the plurality of PDU sessions that match the group identifier.

24. The network node of claim 21, wherein the applying the PDU session identifying component to identify the plurality of PDU sessions to be configured comprises:
retrieving a header logic command from the PDU session identifying component;
applying the header logic command to PDU sessions managed by the access node to identify the plurality of PDU sessions that conform with the header logic command.

25. The network node of claim 21, wherein the PDU session modifying component further defines a time window in which the PDU bulk configuration request should be applied, and wherein the method further comprises the network node confirming to apply the PDU session modifying component during the defined time window.

26. The network node of claim 25, further comprising:
the network node receiving a new PDU bulk configuration request; and,
replacing the PDU bulk configuration request with the new PDU bulk configuration request.

27. The network node of claim 21, wherein the PDU session modifying component further comprises a command component to be applied to the filtered PDU sessions, and wherein the method further comprises the network node applying the command component to the filtered PDU sessions.

28. The network node of claim 21, wherein the command component is selected from the group consisting of:
PDU Session Setup;
PDU Session Modify;
PDU Session Modification Indication;
Initial Context Setup; and,
UE Context Modification Indication.

* * * * *